United States Patent
Maroney

(10) Patent No.: US 10,025,516 B2
(45) Date of Patent: *Jul. 17, 2018

(54) PROCESSING DATA ACCESS REQUESTS FROM MULTIPLE INTERFACES FOR DATA STORAGE DEVICES

(71) Applicant: WESTERN DIGITAL TECHNOLOGIES, INC., San Jose, CA (US)

(72) Inventor: John E. Maroney, Irvine, CA (US)

(73) Assignee: Western Digital Technologies, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/728,419

(22) Filed: Oct. 9, 2017

(65) Prior Publication Data

US 2018/0032274 A1    Feb. 1, 2018

Related U.S. Application Data

(63) Continuation of application No. 14/667,470, filed on Mar. 24, 2015, now Pat. No. 9,785,361.

(51) Int. Cl.
*G06F 12/00* (2006.01)
*G06F 13/00* (2006.01)
*G06F 3/06* (2006.01)

(52) U.S. Cl.
CPC .......... *G06F 3/0619* (2013.01); *G06F 3/0634* (2013.01); *G06F 3/0659* (2013.01); *G06F 3/0688* (2013.01)

(58) Field of Classification Search
None
See application file for complete search history.

(56) References Cited

U.S. PATENT DOCUMENTS

| | | | | |
|---|---|---|---|---|
| 4,893,279 | A | * | 1/1990 | Rahman .................. G06F 12/06 365/189.04 |
| 9,626,124 | B2 | * | 4/2017 | Lipinski ................ G06F 3/0661 |
| 2007/0208887 | A1 | * | 9/2007 | Kim ........................ G06F 13/28 710/22 |
| 2011/0138116 | A1 | * | 6/2011 | Lipinski ................ G06F 3/0607 711/103 |
| 2017/0006694 | A1 | * | 1/2017 | Davis ................. H05B 37/0263 |

* cited by examiner

*Primary Examiner* — Sean D Rossiter
(74) *Attorney, Agent, or Firm* — Chang & Hale LLP

(57) ABSTRACT

Systems and methods are disclosed for processing data access requests received from a direct access storage (DAS) interface and/or a network access storage (NAS) interface. The data access requests may be received from the DAS interface and the NAS interface substantially simultaneously. The data access requests may be scheduled based on priorities for the data access requests.

29 Claims, 6 Drawing Sheets

PROCESSING DATA ACCESS REQUESTS FROM MULTIPLE INTERFACES FOR DATA STORAGE DEVICES

CROSS-REFERENCE TO RELATED APPLICATIONS

The present application is a continuation of U.S. patent application Ser. No. 14/667,470 filed on Mar. 24, 2015, entitled PROCESSING DATA ACCESS REQUESTS FOR DATA STORAGE DEVICES (issued as U.S. Pat. No. 9,785,361), the disclosure of which is hereby incorporated by reference in its entirety.

BACKGROUND

Distribution of data storage across one or more data storage devices can provide increased data security through data redundancy. One type of data storage device may be a direct-attached storage (DAS) device. DAS devices may provide one or more computing devices with direct access to data via a connection cable (e.g., via a direct or physical connection). Another type of data storage device may be a network-attached storage (NAS) device. NAS devices may provide access to data over computer networks (e.g., via a wired and/or wireless network).

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

Figure 1:
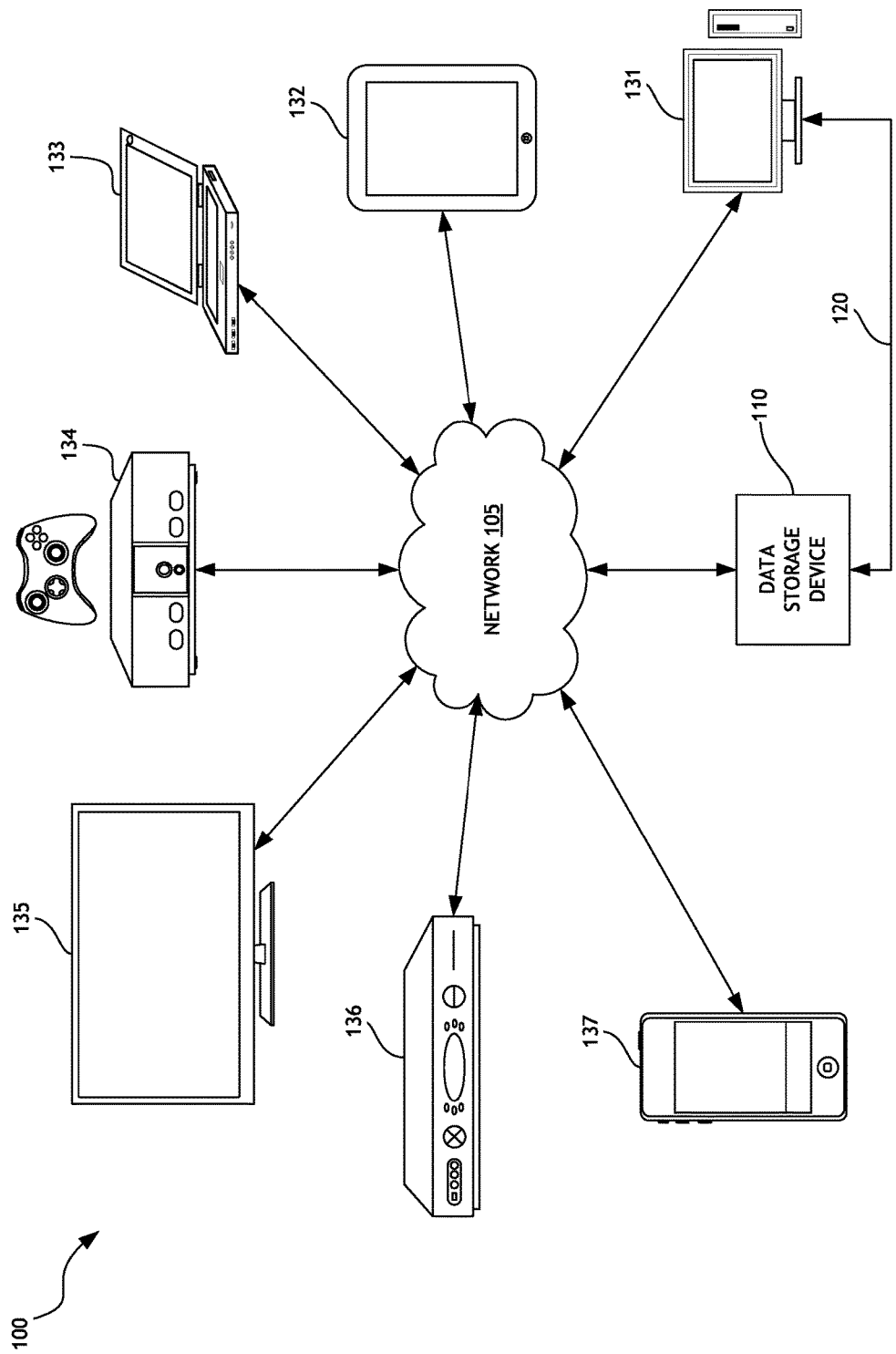
FIG. 1 is a diagram of a data storage system, according to an embodiment.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claimed invention. Disclosed herein are example implementations, configurations, and/or embodiments relating to receiving and/or processing data access requests for a data storage device.

Overview

Data storage devices/systems may provide one or more computing devices with file-level data storage. One example of a data storage device/system may be a DAS device. The DAS device may be coupled to a computing device (e.g., a laptop computer, a desktop computer, etc.) via a connection cable (e.g., a Thunderbolt cable, an external serial advanced technology attachment (eSATA) cable, a universal serial bus (USB) cable, etc.) coupled to a DAS interface (e.g., a communication interface such as USB, Thunderbolt, etc.) of the DAS device. A DAS device may provide a convenient mechanism for transferring data between computing devices, increasing the storage capacity (e.g., increase the storage space) of a computing device, and/or providing increased data security through data redundancy. Another example of a data storage device/system may be a NAS device. A NAS device may be coupled to a network via a NAS interface (e.g., a network interface such as Ethernet, 802.11 (Wi-Fi), etc.). A NAS device may provide file-level data storage over a network (e.g., a computer network), wherein access to the stored data is accessible to a group of clients. For example, a NAS device may include hardware, software, or a combination of such elements, configured such that the NAS device operates as a file server. NAS devices/systems can provide a convenient mechanism for sharing data among multiple computers and/or remotely accessing data stored on the NAS devices/systems. As compared to traditional file servers, benefits of NAS devices/systems may include the ability to access data from various locations (e.g., remote locations), faster data access, easier administration, and/or simpler configuration.

Certain embodiments disclosed herein provide the ability for a data storage device to receive and/or process data access requests that are received from a communication interface (e.g., a DAS interface) and a network interface (e.g., a NAS interface) substantially simultaneously. The data storage device may schedule the data access requests based on various factors and/or parameters. The data storage device may also operate in a DAS mode (e.g., a DAS only mode where data is received via the DAS interface only) or a NAS mode (e.g., a NAS only mode where data is received via the NAS interface only).

While certain embodiments are disclosed herein in the context of a particular DAS interface (e.g., USB, Thunderbolt, eSATA, etc.) and/or NAS interface (e.g., Wi-Fi, 802.11, Ethernet, etc.), the principles disclosed herein may be applicable to any suitable or desirable communication interface.

Data Storage Devices

FIG. 1 is a diagram of a data storage system 100, according to an embodiment. In the data storage system 100 a data storage device 110 may be communicatively coupled to one or more client devices (e.g., computing devices) in order to provide file-based data storage services to the one or more client devices (e.g., one or more computing devices). Types of client devices (e.g., computing devices) that may have access to the data storage device 110 may include, but are not limited to, phones 137 (e.g., smart phones, cellular phones, etc.), cable set-top boxes 136, smart TV's 135, video game consoles 134, laptop computers 133, tablet computers 132, desktop computers 131, wearable computers and/or other types of computing devices.

The data storage device 110 device may provide various client devices (e.g., phones 137, cable set-top boxes 136, smart TV's 135, video game consoles 134, laptop computers 133, tablet computers 132, desktop computers 131) with access to various types of user data stored on the data storage device 110. The data storage device 110 may also allow users to store various types of user data on the data storage device 110. The data storage device 110 may comprise magnetic media, hard disk media, and/or solid-state media.

While certain description herein refers to solid state memory generally, it is understood that solid state memory may comprise one or more of various types of solid state non-volatile memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

With further reference to FIG. 1, the data storage device 110 (e.g., magnetic disk drive, hybrid hard drive, solid-state drive, etc.) may include a controller (not shown in FIG. 1) configured to receive data commands and to execute such commands in one or more non-volatile memory components of the data storage device 110. Such commands may include data read/write commands, and the like. The controller may be configured to receive data commands from a communication interface residing on a computing device. Data commands may specify a block address in the data storage device 110 and data may be accessed/transferred based on such commands. The data commands may also be referred to as data access requests.

The data storage device 110 may be configured to store data in one or more magnetic recording disks and/or the solid state memory devices/arrays. In an embodiment, the data storage device 110 may comprise a cable box, a backup disk drive, a media storage unit, a streaming media device, a digital camera, or any other electronic device which may store data that may need to be accessed directly or wirelessly.

In certain embodiments, the data storage device 110 may store data received from a client device such that the data storage device 110 acts as data storage for the client device. To facilitate this function, the data storage device 110 may implement a logical interface. The logical interface can present to the client device memory as a set of logical addresses (e.g., sequential/contiguous addresses) where data may be stored. Internally, the controller may map logical addresses to various physical memory addresses in the non-volatile memory of the data storage device 110. Mapping data indicating the mapping of logical addresses to physical memory addresses may be maintained in the data storage device 110.

In one embodiment, the data storage device 110 may be a DAS device. The DAS device may be directly coupled to client device (e.g., a desktop computer 131) via connection cable 120. The connection cable 120 may be coupled to a communication interface (e.g., a USB interface, a Thunderbolt interface, etc.) of the DAS device (e.g., data storage device 110). In another embodiment, the data storage device 110 may also be a NAS device. The NAS device may also be coupled to the client devices (e.g., computing devices) 131-137 via a network 105. The NAS device may be coupled to the network 105 via a network interface (e.g., an Ethernet interface, an 802.11 (Wi-Fi) interface, etc.). Each of the client devices 131-137 may also be coupled to the network 105 via a network interface. In one embodiment, network 105 may include a public network (e.g., the Internet), a private network (e.g., a local area network (LAN)), a wide area network (WAN) such as the Internet, a wired network (e.g., Ethernet network), a wireless network (e.g., an 802.11 network or a Wi-Fi network), a cellular network (e.g., a Long Term Evolution (LTE) network), routers, hubs, switches, server computers, other types of computer networks, and/or a combination thereof.

In one embodiment, the data storage device 110 may receive data access requests from the client devices 131-137 via the communication interface (e.g., a DAS interface such as USB, Thunderbolt) and/or via the network interface (e.g., Ethernet, 802.11, etc.). The data access requests may be messages, commands, and/or requests to access data on the data storage device. For example, a data access request may indicate that a computing device wants to read data from the data storage device 110. In another example, a data access request may indicate that a computing device wants to write data to the data storage device 110.

Although data storage devices/drives/systems may provide various benefits, as described above, in certain configurations, such systems may be associated with various issues and/or drawbacks. As discussed above, the data storage device 110 may be a DAS device that is coupled to one or more of the client devices 131-137 via a connection cable 120 (and may be a NAS device that is coupled to the one or more of the client devices 131-137 via the network 105. Generally, data storage devices may be unable to receive and/or process data access requests from both a network interface (e.g., a NAS interface) and a communication interface (e.g., a DAS interface) substantially simultaneously. For example, some data storage devices may operate exclusively in a DAS mode (e.g., a mode where data access requests may only be received via the communication interface) or a NAS mode (where data access requests may only be received via the network interface). In another example, other data storage devices may multiplex data access requests between a network interface and a communication interface. For example, the data storage device may receive data access requests from the communication interface for a first period of time and may switch to receiving data access requests from the network interface for a second period of time.

It may be useful to provide a data storage device that allows data access requests to be received and/or processed from both a communication interface and a network interface substantially simultaneously. Certain embodiments disclosed herein provide the ability to receive and/or process data access requests that are received from a communication interface (e.g., a DAS interface) and a network interface (e.g., a NAS interface) substantially simultaneously. This may allow the data storage device 110 to receive and/or process data access requests more quickly and/or efficiently. This may also allow the data storage device 110 to be used as both a DAS device and a NAS device simultaneously.

Substantially Simultaneous NAS and DAS Access to Data Storage Devices

Figure 2:
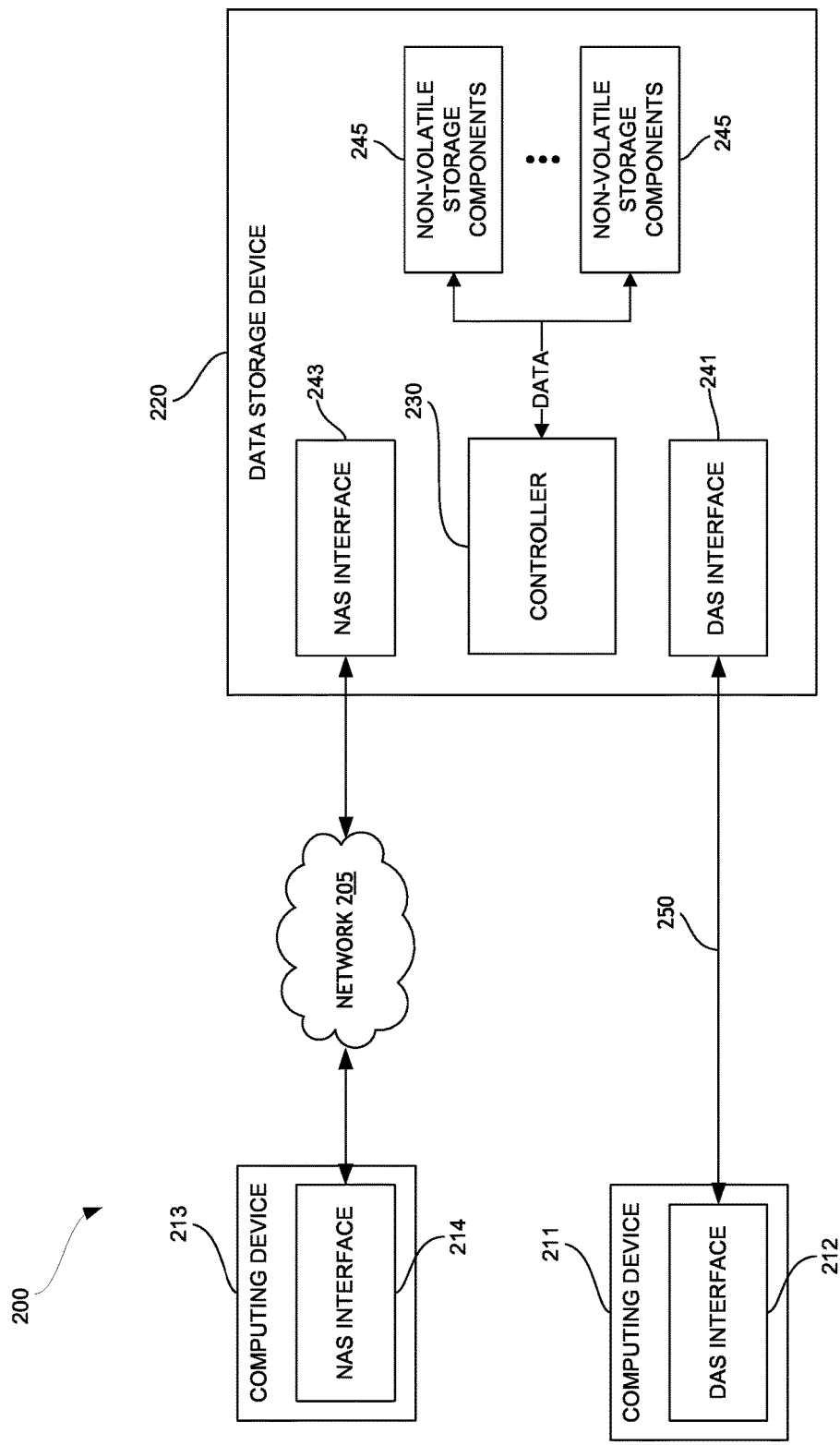
FIG. 2 is a diagram of a data storage system, according to an embodiment.

FIG. 2 is a diagram of a data storage system 200 according to an embodiment. The data storage system 200 includes a computing device 211, a computing device 213, a connection cable 250, and a data storage device 220. Each of the computing devices 211 and 213 may be a laptop computer, a desktop computer, a server computer, a tablet computer, a smart phone, a set-top box, a smart TV, a video game console, etc. The data storage device 220 may include a controller 230, a DAS interface 241 (e.g., USB, Thunderbolt, eSATA, etc.), a NAS interface 243 (e.g., Ethernet, Wi-Fi, etc.), and non-volatile storage components 245. In one embodiment, the non-volatile storage components 245 may include non-volatile magnetic media, and/or solid-state memory, such as NAND flash. The controller 230 may provide overall control for the data storage device 220. In certain embodiments, the data storage device 220 may be a hard disk drive. The non-volatile storage components 245 may include one or more disks and the data storage device 220 may further include one or more heads (not shown) actuated radially over the disk(s), and a spindle motor for rotating the disk(s). Alternatively to, or in addition to, magnetic rotating media, solid-state memory and/or other non-volatile memory such as MRAM and/or phase change memory may be used. In certain embodiments, the data storage device 220 may be, for example, a hybrid hard drive including both magnetic media and solid-state media.

The controller 230 may receive data access requests (e.g., data and storage access commands) from a DAS interface 212 (e.g., a USB interface, a Thunderbolt interface) of the computing device 211. Data access requests communicated by the DAS interface 212 may include write and read commands issued by the computing device 211. The data access requests may specify an LBA, or range of LBAs, in the data storage device 220, and the controller 230 may execute the received data access requests in the non-volatile storage components 245. The controller 230 may also receive data access request from a NAS interface 214 (e.g., an Ethernet interface, a Wi-Fi interface, etc.) of the computing device 213. The controller may determine an LBA and/or a range of LBAs in the data storage device 220 based on the data access requests and may execute the received data access requests in the non-volatile storage components 245. In a hybrid hard drive, data may be stored in a magnetic media storage component as well as non-volatile solid-state memory.

The data storage device 220 may store data received from the computing devices 211 and 213, such that the data storage device 220 acts as memory for the computing devices 211 and 213. To facilitate this memory function, the controller 230 may implement a logical interface. The logical interface may present to the computing devices 211 and 213 the memory of the data storage device 220 as a set of logical addresses (e.g., contiguous address) where data can be stored. The controller 230 may map logical addresses to various physical memory addresses in the non-volatile storage components 245 and/or other memory module(s).

The data storage device 220 may be configured to implement data redundancy, wherein user data stored in the non-volatile storage components 245 is maintained in one or more internal and/or external drives. For example, the controller 230 may include a data redundancy management module (not shown in FIG. 2) configured to implement redundancy functionality. The data redundancy management module may implement redundant array of independent disks (RAID) technology, wherein the non-volatile storage components 245 includes a plurality of internal drives, disks, or other data storage partitions combined into a logical unit for the purposes of data redundancy and performance improvement. In addition, or alternatively, the data redundancy management module may be configured to implement RAID using one or more internal memory modules in combination with one or more external memory devices, as discussed in greater detail below.

For RAID purposes, the non-volatile storage components 245 may include an array of one or more storage devices, such as hard disks or other memory modules that are configured to store user data. In certain embodiments, such internal memory modules/disks may be each directly coupled to the controller 230 to provide a high bandwidth interface for reading and writing user data. The non-volatile storage components 245 may include one or more additional memory modules configured to store parity information.

The controller 230 may be configured to divide and replicate user data among the physical RAID memory modules, providing storage virtualization; the array may be accessed by the computing devices 211 and 213 as a single drive. Data may be distributed across the RAID memory modules/drives according to any desirable or practical RAID level, depending on the level of redundancy and/or performance desired. For example, the data storage device 220 may be configured to implement RAID 0, RAID 1, RAID 5, RAID 6, RAID 10, other RAID technology, or other erasure coding technology, depending on data reliability, availability, performance and/or capacity considerations or requirements.

The computing device 211 may be coupled to the data storage device 220 via connection cable 250. The connection cable 250 may directly connect the computing device 211 and the data storage device 220. The connection cable 250 may use one or more communication interfaces (such as a bus interface) and/or protocols that may allow the computing device 211 to communicate with the data storage device 220. The DAS interface 212 and 241 may be USB interfaces, Thunderbolt interfaces, serial attached SCSI (SAS), eSATA interface, etc.

In one embodiment, the connection cable 250 may include one or more data lines (e.g., one or more wires, pins, etc.) that allow the computing device 211 to communicate data with the data storage device 220. For example, the connection cable 250 may include data lines (not shown in FIG. 2) that the computing device 211 may use to read data from and/or write data to the data storage device 220. The computing device 211 may communicate data to and from the data storage device using the DAS interface 212 (e.g., via the DAS interface 212). In another embodiment, the computing device 211 may provide an input voltage to the data storage device 220 and the data storage device 220 may use the input voltage to operate one or more components of the data storage device 220 (e.g., the controller 230, the non-volatile storage components 245, a motor, etc.). The connection cable 250 may include one or more voltage lines (e.g., wires, pins, etc.) that may receive the input voltage from the computing device 211 via the DAS interface 212. The one or more voltage lines may provide the input voltage (received from the computing device 211) to the data storage device 220 via the communication interface 240. In a further embodiment, the data storage device 220 may be coupled to a separate power source (e.g., may be coupled to a battery, to an AC adaptor, to a wall outlet, etc.).

In one embodiment, the connection cable 250 may include a bridge unit (not shown in FIG. 2). For example, the connection cable 250 may include a USB bridge, a Thunderbolt bridge, or other type of bridge. The bridge unit may translate between two different types of communication interfaces and/or protocols. For example, if a connected storage device communicates in a first protocol, but not a second protocol, the bridge unit may translate the second protocol to the first protocol, or vice versa.

The computing device 213 may be communicatively coupled to the data storage device 220 via a network 205 (e.g., one or more of a Wi-Fi network, a LAN, a cellular network, etc.). The computing device 213 may send data (e.g., files, images, movies, etc.) and/or data access requests to the data storage device 220 via the NAS interface 214 (e.g., an Ethernet interface, a Wi-Fi interface, etc.) and the network 205. The data storage device 220 may receive the data and/or data access requests from the computing device 213 via the NAS interface 243.

In one embodiment, the controller 230 may determine whether the data storage device 220 should be configured to operate in a dual access mode. In the dual access mode, the data storage device 220 may be able to receive data access requests from the computing device 211 (via the DAS interface 241) and the computing device 213 (via the NAS interface 243) substantially simultaneously (as discussed in more detail below). In another embodiment, the controller may also determine whether the data storage device 220 should operate in a DAS mode (e.g., a mode where data access requests are received via the DAS interface 241 only) or a NAS mode (a mode where data access requests are received via the NAS interface 243 only). In one embodiment, the controller 230 may determine priorities for the data access requests received from the DAS interface 241 and the NAS interface 243 (as discussed in more detail below). The controller 230 may schedule the data access requests based on the priorities for the data access requests (as discussed in more detail below). In another embodiment, the controller 230 may also determine or calculate LBAs for data access requests received via the NAS interface 243 (as discussed in more detail below). In a further embodiment, the controller 230 may configure a random access memory (e.g., a dynamic access memory (DRAM)) to cache data received via the DAS interface 241 and the NAS interface 243 (as discussed in more detail below).

Figure 3:
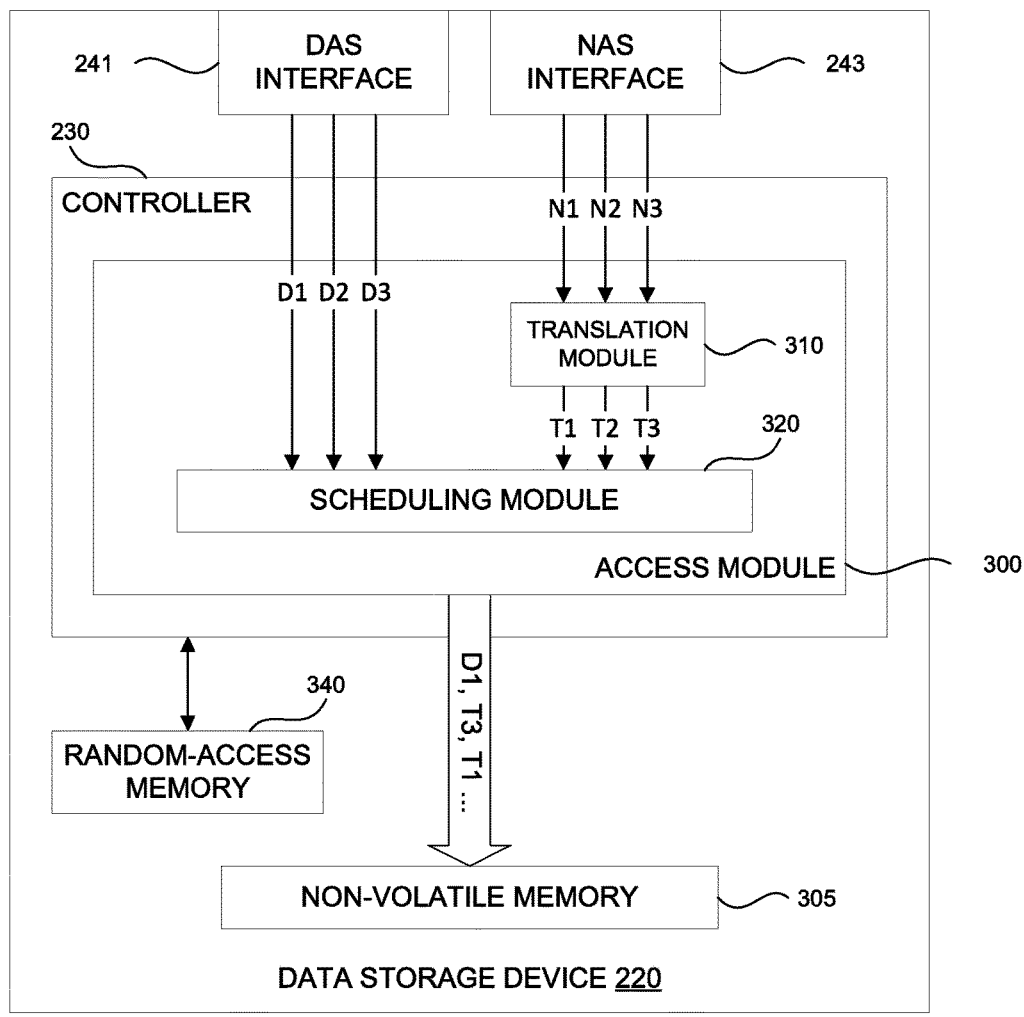
FIG. 3 is a diagram of a data storage device, according to an embodiment.

FIG. 3 is a diagram of a data storage device 220 according to an embodiment. The data storage device 220 includes a controller 230, a random-access memory 340, a DAS interface 241 (e.g., USB, Thunderbolt, eSATA, etc.), a NAS interface 243 (e.g., Ethernet, Wi-Fi, etc.), and a non-volatile memory 305 (e.g., one or more non-volatile storage components such as magnetic media, solid-state memory, etc.). The data storage device 220 may store data received from computing devices such that the data storage device 220 acts as memory for the computing devices. The controller 230 includes an access module 300. The access module 300 includes a translation module 310 and a scheduling module 320. In some embodiments, the access module 300 may be separate from the controller 230. In other embodiments, the translation module 310 and/or the scheduling module 320 may be separate from the access module 300.

As discussed above, the data storage device 220 may be coupled to one or more computing devices via the DAS interface 241 (e.g., a USB interface, an eSATA interface, a Thunderbolt interface, etc.). The data storage device may also be coupled to one or more computing devices via the NAS interface 243 (e.g., an Ethernet interface, a Wi-Fi interface, etc.). The data storage device 220 may receive the data and/or data access requests from the computing devices via DAS interface 241 and/or NAS interface 243. The data storage device 220 may be configured to implement data redundancy (e.g., RAID), wherein user data stored in the non-volatile memory 305 is maintained in one or more internal and/or external drives.

In one embodiment, the controller 230 and/or access module 300 may determine whether the data storage device 220 should be configured to operate in a dual access mode. For example, the controller 230 and/or access module 300 may determine whether the DAS interface 241 is coupled to a computing device and whether the NAS interface 243 is coupled to a network (e.g., a Wi-Fi network, a LAN, etc.) and/or computing device. If the DAS interface is coupled to a computing device and the NAS interface 243 is coupled to a network/computing device, the controller 230 and/or access module 300 may determine that the data storage device 220 should operate in a dual access mode. In the dual access mode, the data storage device 220 may substantially simultaneously receive and/or process data access requests from a first computing device directly coupled to the data storage device 220 (e.g., local or direct access) and a second computing device coupled to the data storage device 220 via a network (remote or network access). For example, referring to FIG. 2, the data storage device 220 may be able to receive and/or process data access requests from the computing device 211 (via the DAS interface 241) and the computing device 213 (via the NAS interface 243) substantially simultaneously (e.g., data access requests may be received via the DAS interface 241 and the NAS interface 243 at substantially the same time). In another example, referring to FIG. 2, a first access request may be received via the DAS interface 241 and a second access request may be received via the NAS interface 243 before the first access request is scheduled. In a further example, referring to FIG. 2, a first access request may be received via the NAS interface 243 and a second access request may be received via the DAS interface 241 before the first access request is scheduled.

In another embodiment, the data access requests received from the DAS interface 241 may include one or more LBAs and the controller 230 and/or access module 300 may use the one or more LBAs to access (e.g., read and/or write) data stored in the non-volatile memory 305. For example, data access request D1, D2, and D3 may include one or more LBAs. The controller 230 and/or access module 300 may map the one or more LBAs to various physical memory addresses in the non-volatile memory 305 and/or other memory module(s). In another embodiment, the data access requests received from the NAS interface may not include LBAs. For example, a data access request received from the NAS interface 243 may include an identifier (e.g., a file name, a hash, etc.) for a data object (e.g., a file, a directory) stored in the non-volatile memory 305. The translation module 310 may determine and/or calculate one or more LBAs for data access requests received via the NAS interface 243 and the controller 230 and/or access module 300 may use the one or more LBAs to access (e.g., read and/or write) data stored in the non-volatile memory 305. For example, the translation module 310 may receive data access requests N1, N2, and N3. The translation module 310 may determine and/or calculate one or more LBAs and may generate data access requests T1, T2, and T3. The translation module may also update and/or modify the data access requests N1, N2, and N3 (e.g., may add the one or more LBAs to the data access requests N1, N2, and N3) to generate the data access requests T1, T2, and T3.

In one embodiment, the scheduling module 320 may determine priorities for the data access requests received from the DAS interface 241 and the NAS interface 243. The scheduling module 320 may determine (e.g., calculate) priorities for the data access requests based on one or more factors/parameters. In one embodiment, data access requests received from a type of interface may be given a higher priority (e.g., data access requests D1, D2, and D3 received from the DAS interface 241 may be given higher priority or data access requests N1, N2, and N3 received from the NAS interface 243 may be given higher priority). In another embodiment, the size of a data access request may be used to determine a priority of a data access request. For example, a smaller data access request may be given more priority or a larger data access request may be given more priority. In a further embodiment, the locations in the non-volatile memory 305 for the data access requests may be used to determine priority's for data access requests. For example, data access requests that are accessing (e.g., reading and/or writing) data on a same track/cylinder may be given higher priority. In another example, data access requests that are accessing data on the same page and/or bank of memory may be given higher priority. In other embodiments, various other types of factors and/or parameters may be used to determine priorities for data access requests. In addition, combinations of factors and/or parameters may be used to determine priorities for data access requests. Furthermore, different factors and/or parameters may be weighted differently when determining priorities for data access requests.

In one embodiment, the scheduling module 320 may schedule data access requests with higher priorities before data access requests with lower priorities. The scheduling module 320 may insert data access requests into a queue (e.g., a data access request queue, a list, etc.) and the controller 230 and/or access module 300 may perform the data access requests that are in the queue. In one embodiment, the scheduling module 320 may determine the priorities of data access requests prior to inserting the data access requests into the queue. For example, the scheduling module 320 may calculate/determine priorities for a plurality of data access requests and may insert data access requests with higher priorities into the queue first. In another embodiment, the scheduling module 320 may insert the data access requests into the queue and may determine the priorities of the data access requests. The scheduling module 320 may reorder (e.g., shuffle) the data access requests within the queue after determining the priorities of the data access requests. In one embodiment, the scheduling module 320 may also update the priorities of data access requests based on an amount of time that a data access request has been in the queue. For example, the longer a data access request remains in the queue, the higher the priority for the data access request. This may prevent a data access request from being pre-empted by other data access requests with higher priority.

In one embodiment, the access module 300 may also determine whether the data storage device should operate in DAS mode or NAS mode. For example, the access module 300 may determine whether the DAS interface 241 is coupled to a computing device or whether the NAS interface 243 is coupled to a network and/or computing device. When operating in DAS mode, data and/or data access requests may be received via the DAS interface 241 only. When operating in NAS mode, data and/or data access request may be received via the NAS interface 243 only. The translation module 310 may determine and/or calculate one or more LBAs for data access requests received via the NAS interface 243 when operating in NAS mode. When the data storage device operates in DAS mode (e.g., DAS only mode) or NAS mode (e.g., NAS only mode), the scheduling module may also schedule the data requests received from the DAS interface 241 (when the data storage device 220 operates in DAS mode) or the NAS interface 243 (when the data storage device 220 operates in NAS mode) based on priority (as discussed above).

In one embodiment, the controller 230 and/or access module 300 may configure a random-access memory 340 to cache data. Examples of random access memory may include, but are not limited to, dynamic random-access memory (DRAM), static random-access memory (SRAM), etc. The random-access memory 340 may be configured based on whether the data storage device 220 is operating in dual mode, DAS mode, or NAS mode. For example, a first portion of the random-access memory 340 may be configured or used to cache data received via the DAS interface 241 and a second portion of the random-access memory 340 may be used configured or used to cache data received from the NAS interface 243 when the data storage device 220 is operating in dual mode. In another example, the random-access memory 340 (e.g., all of the random access memory 340) may be configured or used to cache data received via the DAS interface 241 when the data storage device 220 is operating in DAS mode. In a further example, the random-access memory 340 (e.g., all of the random access memory 340) may be configured or used to cache data received via the NAS interface 243 when the data storage device 220 is operating in NAS mode.

In one embodiment, the random-access memory 340 and/or any other caches/memories used by the controller 230 may be periodically flushed to help protect against the loss of data if the data storage device 220 experiences a failure. For example, data in the random-access memory 340 (or other caches/memories) may be periodically written to the non-volatile memory 305 to help prevent the data in the random-access memory 340 from being lost if the data storage device experiences a power failure or crashes. In another embodiment, the random-access memory 340 and/or other caches/memories may be coupled to a power supply (e.g., a capacitor) that may allow the random-access memory 340 to retain data for a period of time in the event of a power loss. This may help prevent the data in the random-access memory from being lost during a temporary power failure. For example, the power supply may provide short term power protection for the random-access memory 340 (or other caches/memories).

In one embodiment, the access module 300 may also handle concurrency issues for different access requests. For example, a first data access request to access a block of data may be received on the NAS interface 243 and a second data access request to access the same block of data may be received on the DAS interface 241. If both data access requests are performed at the same time, the block of data may become inconsistent. The access module 300 may determine which data access request should be performed first and may prevent the block of data from being accessed simultaneously by the first data access request and the second data access request. For example, the access module 300 may determine which data access request was received first by the access module 300 and may prioritize the data access request that was received first. In another example, the access module 300 may perform the data access request received from the DAS interface 241 first.

Figure 4:
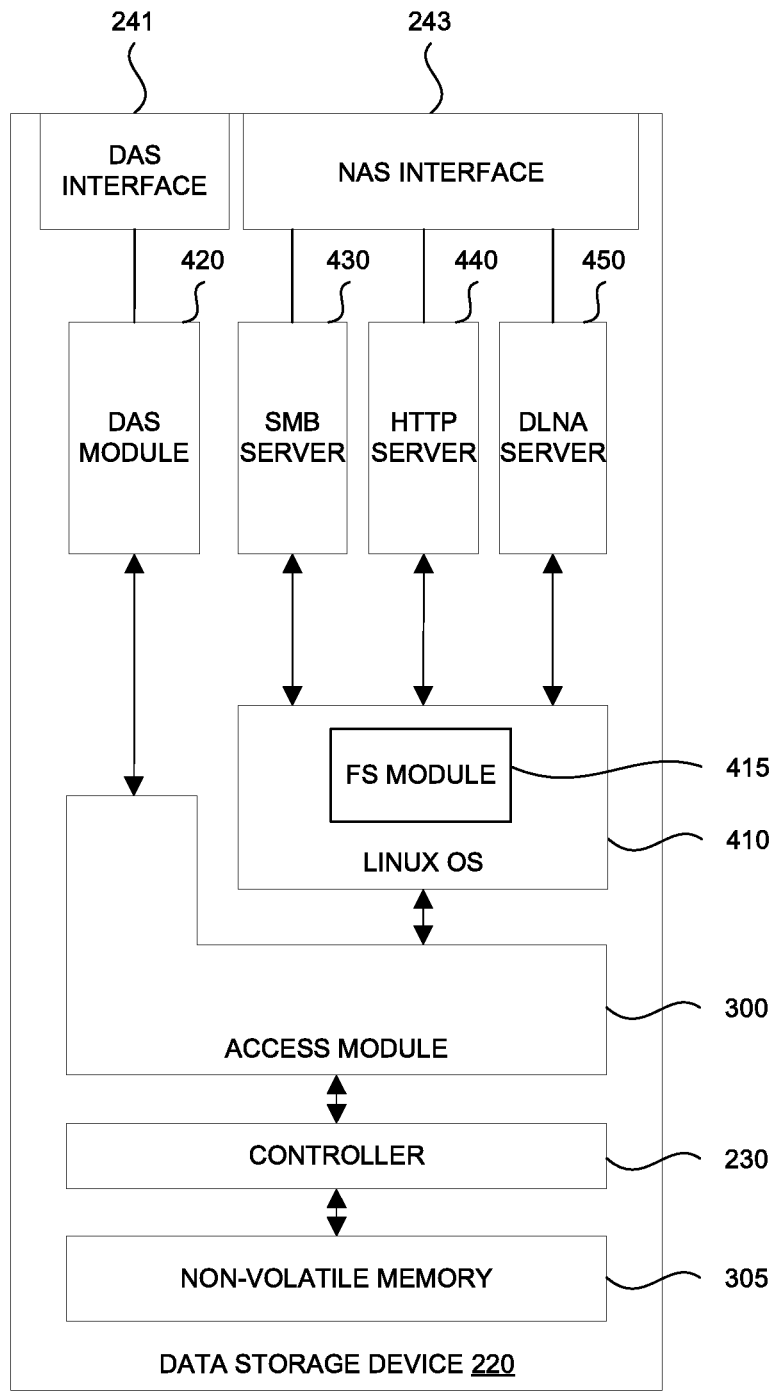
FIG. 4 is a diagram of a data storage device, according to an embodiment.

FIG. 4 is a diagram of a data storage device 220 according to an embodiment. The data storage device 220 includes a controller 230, a non-volatile memory 305 (e.g., one or more non-volatile storage components such as magnetic media, solid-state memory, etc.), an access module 300, a Linux operating system (OS) 410, a DAS module 420, a server message block (SMB) server 430, a hypertext transfer protocol (HTTP) server 440 (e.g., a web server), and a digital live network alliance (DLNA) server 450. The data storage device 220 may store data received from the computing devices such that the data storage device 220 acts as memory for the computing devices. As discussed above, the data storage device 220 may be coupled to one or more computing devices via a DAS interface 241 and/or NAS interface 243. The data storage device 220 may receive data and/or data access requests from computing devices via the DAS interface 241 and/or the NAS interface 243.

The DAS interface 241 may be coupled to a DAS module 420. In one embodiment, the DAS module 420 may allow the data storage device to transmit/receive data and/or data messages via the DAS interface 241. For example, the DAS module 420 may understand the communication protocol used by the DAS interface 241. The DAS module 420 may be able to extract and/or identify the data access requests from the messages and/or signaling protocols used by the DAS interface 241. For example, the DAS module 420 may be a USB driver that may understand the USB protocol and may extract/identify the data access requests from USB packets or frames.

The SMB server 430 may be coupled to the NAS interface 243. For example, the SMB server 430 may receive data and/or data access requests from computing devices via the NAS interface 243. In one embodiment, the SMB server 430 may allow computing devices to access files and/or folders that are stored in the non-volatile memory 305 of the data storage device 220. For example, the data storage device 220 may be coupled to a LAN (via the NAS interface 243) and the SMB server 430 may allow computing devices coupled to a LAN to access files and/or folders of the data storage device 220.

The HTTP server 440 may be coupled to the NAS interface 243. For example, the HTTP server 440 may receive data and/or data access requests from computing devices via the NAS interface 243. In one embodiment, the HTTP server 440 may also allow computing devices to access files and/or folders that are stored in the non-volatile memory 305 of the data storage device 220. For example, the data storage device 220 may be coupled to a WAN (e.g., the Internet) and the HTTP server 440 may be a web server that allows data to be transferred between the data storage device 220 and the computing devices of the WAN.

The DLNA server 450 may be coupled to the NAS interface 243. For example, the DLNA server 450 may receive data and/or data access requests from computing devices via the NAS interface 243. In one embodiment, the DLNA server 450 may allow computing devices to access multimedia files (e.g., music, pictures/images, movies, etc.) and/or folders that are stored in the non-volatile memory 305 of the data storage device 220. For example, the data storage device 220 may be coupled to a LAN (via the NAS interface 243) and the DLNA server 450 may allow computing devices coupled to a LAN to access multimedia files and/or folders of the data storage device 220.

In one embodiment, the Linux OS 410 may be software that manages hardware and software resources of a device (e.g., data storage device 220). The Linux OS 410 may provide common services that allow the SMB server 430, the HTTP server 440, and the DLNA server 450 to function. The SMB server 430, the HTTP server 440, and the DLNA server 450 may each operate in conjunction with the Linux OS 410. For example, the SMB server may be a service, a process, a daemon, etc., that is executed within or executed by the Linux OS 410. In one embodiment, the Linux OS 410 may reside within a partition or file system of the data storage device 220. The Linux OS 410 includes a file system (FS) module 415. In one embodiment, the FS module 415 may operate in conjunction with the access module 300 to access data stored in the non-volatile memory 305. The FS module 415 may receive identifiers (e.g., file names, hashes, etc.) for files and/or folders from one or more of the SMB server 430, the HTTP server 440, and the DLNA server 450. The FS module 415 may determine which blocks of data on the non-volatile memory 305 are associated with the files and/or folders. The FS module 415 may determine LBAs for the blocks of data and/or may allow the access module 300 to determine LBAs for the blocks of data (e.g., may provide a list of the blocks to the access module 300).

In one embodiment, the controller 230 and/or the access module 300 may determine whether the data storage device 220 should be configured to operate in a dual access mode, NAS mode, or DAS mode (as discussed above). The controller 230 and/or the access module 300 may determine priorities for the data access requests received from the DAS interface 241 and the NAS interface 243, and may schedule the data access requests based on the priorities (as discussed above). The controller 230 and/or access module 300 may also receive and/or process requests from the DAS interface 241 and the NAS interface 243 substantially simultaneously. For example, the controller 230 and/or access module 300 may receive a first access request via the NAS interface 241 and a second access request via the NAS interface 243 substantially simultaneously (e.g., the first access request and the second access request may be received at substantially the same time). In another example, referring to FIG. 2, a first access request may be received via the DAS interface 241 and a second access request may be received via the NAS interface 243 before the first access request is scheduled. In a further example, referring to FIG. 2, a first access request may be received via the NAS interface 243 and a second access request may be received via the DAS interface 241 before the first access request is scheduled. The controller 230 and/or the access module 300 may also determine or calculate LBAs for data access requests received via the NAS interface 243 (as discussed above). The controller 230 and/or the access module 300 may also configure a random access memory to cache data received via the DAS interface 241 and/or the NAS interface 243 (as discussed above).

In one embodiment, the access module 300 may be a block level filter driver. For example, the access module 300 may be a driver (or firmware, or hardware, or a combination thereof) that may provide access to data stored on the non-volatile memory 305 at a block level. The access module 300 may receive LBAs (via a data access request) and/or may determine LBAs (for a data access request) to access the data stored on the non-volatile memory 305. The access module 300 may also handle scheduling of data access requests and concurrency issues for different access requests (as discussed above).

Figure 5:
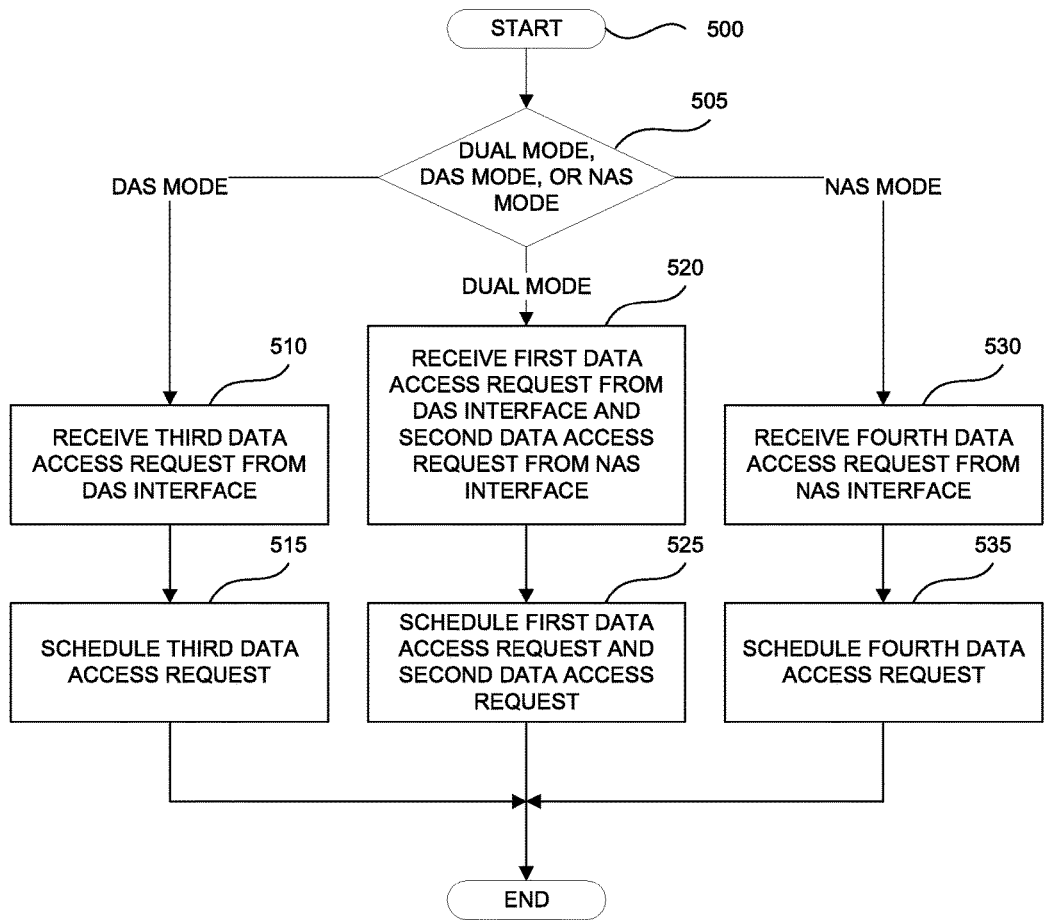
FIG. 5 is a flow diagram illustrating a process for processing data access requests, according to an embodiment.

FIG. 5 is a flow diagram illustrating a process 500 for processing data access requests, according to an embodiment. The process 500 may be performed by a controller and/or an access module, as illustrated and discussed above in conjunction with FIGS. 1-4. The controller and the access module may each be processing logic that includes hardware (e.g., circuitry, dedicated logic, programmable logic, microcode, etc.), software (e.g., instructions run on a processor to perform hardware simulation), firmware, or a combination thereof.

The process 500 begins at block 505 where the process 500 determines whether a data storage device should operate in a dual mode, a DAS mode, or a NAS mode. For example, the process 500 may determine whether the DAS interface and/or NAS interface of the data storage device are coupled to computing devices and/or networks (as discussed above). If the data storage device should operate in the dual mode (e.g., may receive data and/or data access requests from the DAS interface and NAS interface substantially simultaneously), the process 500 may receive a first data access request from the DAS interface and a second data access request from the NAS interface substantially simultaneously. For example, a first access request may be received via a DAS interface and a second access request may be received via a NAS interface before the first access request is scheduled. In another example, a first access request may be received via a NAS interface and a second access request may be received via a DAS interface before the first access request is scheduled. In a further example, the first access request may be received via a DAS interface and the second access request may be received via a NAS interface at substantially the same time (e.g., substantially simultaneously). At block 525, the process 500 may schedule the first data access request and the second data access request. For example the process 500 may schedule the first data access request and the second data access request based on priorities for the data access requests.

If the data storage device should operate in DAS mode (e.g., data and/or data access requests may be received via the DAS interface only), the process 500 receives a third data access request from the DAS interface at block 510. The process 500 may also receive additional data access requests from the DAS interface at block 510. At block 515, the process 500 schedules the third data access request and/or the additional data access requests. For example, the process 500 may schedule the third data access request and/or the additional data access requests based on priorities for the data access requests. If the data storage device should operate in NAS mode (e.g., data and/or data access requests may be received via the NAS interface only), the process 500 receives a fourth data access request from the NAS interface at block 530. The process 500 may also receive additional data access requests from the NAS interface at block 530. At block 535, the process 500 schedules the fourth data access request and/or the additional data access requests. For example, the process 500 may schedule the fourth data access request and/or the additional data access requests based on priorities for the data access requests.

Figure 6:
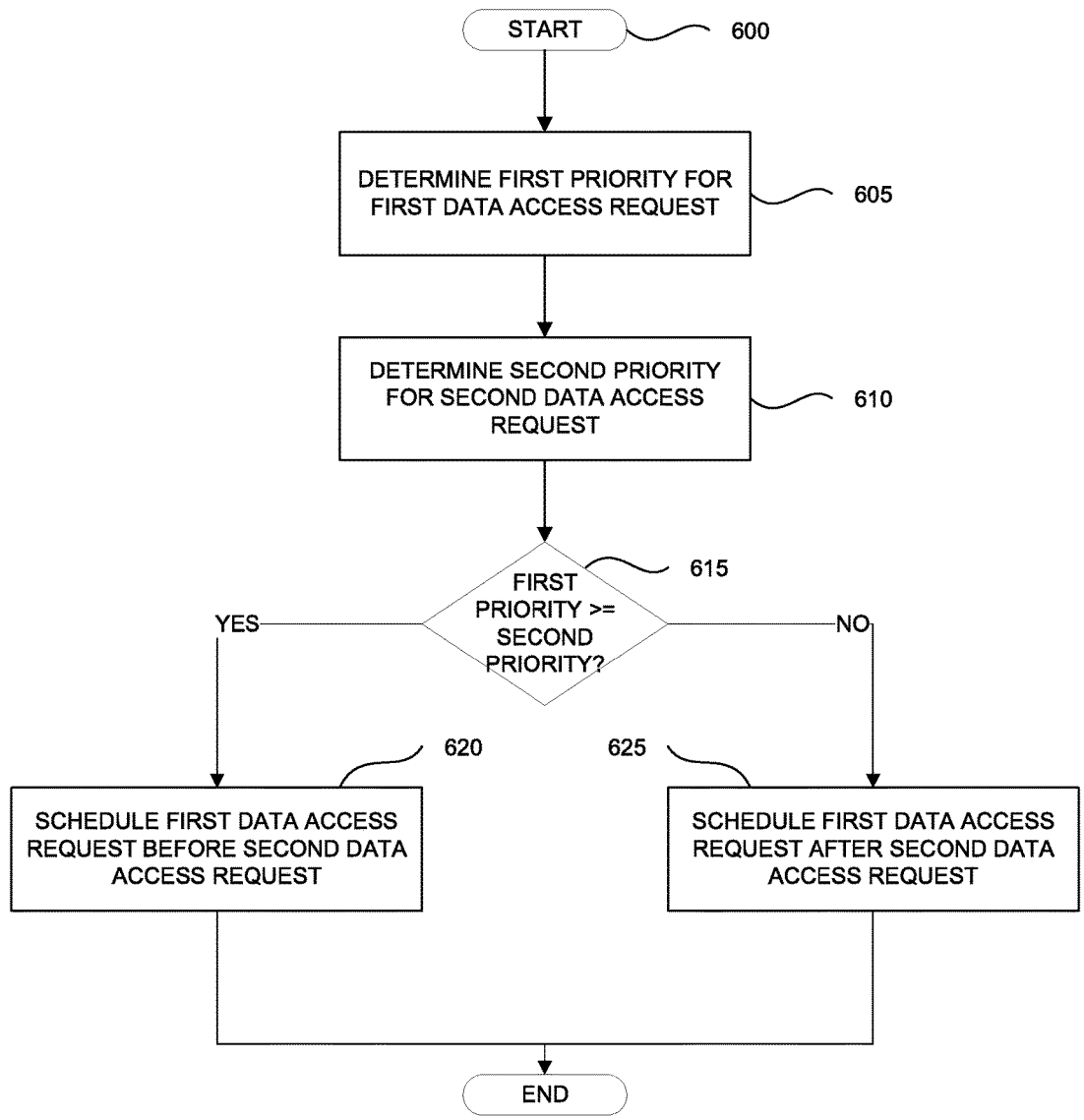
FIG. 6 is a flow diagram illustrating a process for processing data access requests, according to an embodiment.

FIG. 6 is a flow diagram illustrating a process 600 for processing data access requests, according to an embodiment. The process 600 may be performed by a controller and/or an access module, as illustrated and discussed above in conjunction with FIGS. 1-4. The controller and the access module may each be processing logic that includes hardware (e.g., circuitry, dedicated logic, programmable logic, microcode, etc.), software (e.g., instructions run on a processor to perform hardware simulation), firmware, or a combination thereof.

The process 600 begins at block 605 where the process 600 determines a first priority for a first data access request. At block 610, the process 600 determines a second priority for a second data access request. In one embodiment, the first data access request and the second data access request may be received from different interfaces (e.g., one data access request is received via a DAS interface and one data access request is received via a NAS interface). In another embodiment, the first data access request and the second data access request may be received from the same interface (e.g., both data access requests are received via the NAS interface or the DAS interface). At block 615, the process 600 determines whether the first priority is greater than or equal to the second priority. If the first priority is greater than or equal to the second priority, the process 600 may schedule the first data access request before the second data access request at block 620. If the first priority is less than the second priority, the process 600 may schedule the first data access request after the second data access request at block 625.

ADDITIONAL EMBODIMENTS

Those skilled in the art will appreciate that in some embodiments, other types of distributed data storage systems can be implemented while remaining within the scope of the present disclosure. In addition, the actual steps taken in the processes discussed herein may differ from those described or shown in the figures. Depending on the embodiment, certain of the steps described above may be removed, others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc., as used herein are meant as labels to distinguish among different elements and may not necessarily have an ordinal meaning according to their numerical designation.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device, comprising:
a non-volatile memory; and
a controller coupled to the non-volatile memory, the controller configured to:

determine whether to operate in a dual access mode or a direct-access mode, wherein:
the dual access mode allows a data storage device to receive data access requests from a direct-access storage interface and a network-access storage interface simultaneously; and
the direct-access mode allows the data storage device to receive data access requests from the direct-access storage interface only;
receive a first data access request from the direct-access storage interface and a second data access request from the network-access storage interface while operating in the dual access mode, wherein the first data access request and the second data access request are received simultaneously; and
schedule the first data access request and the second data access request while operating in the dual access mode.

2. The data storage device of claim 1, further comprising:
a dynamic random-access memory (DRAM) coupled to the controller, wherein the controller is further configured to:
cache first data received from the direct-access storage interface in a first portion of the DRAM while operating in the dual access mode; and
cache second data received from the network-access storage interface in a second portion of the DRAM while operating in the dual access mode.

3. The data storage device of claim 1, wherein the controller is further configured to:
receive a third data access request from the direct-access storage interface while operating in the direct-access mode; and
schedule the third data access request while operating in the direct-access mode.

4. The data storage device of claim 1, wherein the controller is configured to schedule the first data access request and the second data access request by:
determining a first priority for the first data access request and a second priority for the second data access request; and
scheduling the first data access request and the second data access request based on the first priority and the second priority.

5. The data storage device of claim 4, wherein:
responsive to the first priority being greater than or equal to the second priority, the first data access request is scheduled before the second data access request; and
responsive to the first priority being less than the second priority, the first data access request is scheduled after the second data access request.

6. The data storage device of claim 4, wherein the first priority and the second priority are based on interface types associated with the first data access request and the second data access request.

7. The data storage device of claim 4, wherein the first priority and the second priority are based on a first size for the first data access request and a second size for the second data access request.

8. The data storage device of claim 4, wherein the first priority and the second priority are based on a first storage location associated with the first data access request and a second storage location associated with the second data access request.

9. The data storage device of claim 1, wherein the controller is further configured to:
determine a logical block address for the second data access request.

10. The data storage device of claim 1, wherein the first data access request comprises a logical block address.

11. A data storage device, comprising:
a non-volatile memory; and
a controller coupled to the non-volatile memory, the controller configured to:
determine whether to operate in a dual access mode or a network-access mode, wherein:
the dual access mode allows a data storage device to receive data access requests from a direct-access storage interface and a network-access storage interface simultaneously; and
the network-access mode allows the data storage device to receive data access requests from the network-access storage interface only;
receive a first data access request from the direct-access storage interface and a second data access request from the network-access storage interface while operating in the dual access mode, wherein the first data access request and the second data access request are received simultaneously; and
schedule the first data access request and the second data access request while operating in the dual access mode.

12. The data storage device of claim 11, further comprising:
a dynamic random-access memory (DRAM) coupled to the controller, wherein the controller is further configured to:
cache first data received from the direct-access storage interface in a first portion of the DRAM while operating in the dual access mode; and
cache second data received from the network-access storage interface in a second portion of the DRAM while operating in the dual access mode.

13. The data storage device of claim 11, wherein the controller is further configured to:
receive a third data access request from the network-access storage interface while operating in the network-access mode; and
schedule the third data access request while operating in the network-access mode.

14. The data storage device of claim 11, wherein the controller is configured to schedule the first data access request and the second data access request by:
determining a first priority for the first data access request and a second priority for the second data access request; and
scheduling the first data access request and the second data access request based on the first priority and the second priority.

15. The data storage device of claim 14, wherein:
responsive to the first priority being greater than or equal to the second priority, the first data access request is scheduled before the second data access request; and
responsive to the first priority being less than the second priority, the first data access request is scheduled after the second data access request.

16. The data storage device of claim 14, wherein the first priority and the second priority are based on interface types associated with the first data access request and the second data access request.

17. The data storage device of claim 14, wherein the first priority and the second priority are based on a first size for the first data access request and a second size for the second data access request.

18. The data storage device of claim 14, wherein the first priority and the second priority are based on a first storage location associated with the first data access request and a second storage location associated with the second data access request.

19. A method comprising:
determining whether to operate in a dual access mode or a network-access mode, wherein:
the dual access mode allows a data storage device to receive data access requests from a direct-access storage interface and a network-access storage interface simultaneously; and
the network-access mode allows the data storage device to receive data access requests from the network-access storage interface only;
receiving a first data access request from the direct-access storage interface and a second data access request from the network-access storage interface while operating in the dual access mode, wherein the first data access request and the second data access request are received simultaneously; and
scheduling the first data access request and the second data access request while operating in the dual access mode.

20. The method of claim 19, further comprising:
receiving a third data access request from the network-access storage interface while operating in the network-access mode; and
scheduling the third data access request while operating in the network-access mode.

21. The method of claim 19, further comprising:
determining whether to operate in a network-access mode, wherein the network-access mode allows the data storage device to receive data access requests from the network-access storage interface only;
receiving a third data access request from the network-access storage interface while operating in the network-access mode; and
scheduling the third data access request while operating in the network-access mode.

22. The method of claim 19, wherein scheduling the first data access request and the second data access request comprises:
determining a first priority for the first data access request and a second priority for the second data access request; and
scheduling the first data access request and the second data access request based on the first priority and the second priority.

23. The method of claim 22, wherein:
responsive to the first priority being greater than or equal to the second priority, the first data access request is scheduled before the second data access request; and
responsive to the first priority being less than the second priority, the first data access request is scheduled after the second data access request.

24. The method of claim 22, wherein the first priority and the second priority are based on interface types associated with the first data access request and the second data access request.

25. The method of claim 22, wherein the first priority and the second priority are based on a first size for the first data access request and a second size for the second data access request.

26. The method of claim 22, wherein the first priority and the second priority are based on a first storage location associated with the first data access request and a second storage location associated with the second data access request.

27. The method of claim 19, further comprising:
determining whether to operate in the dual access mode or a direct-access mode, wherein the direct-access mode allows the data storage device to receive data access requests from the direct-access storage interface only.

28. A data storage device, comprising:
data storage means; and
control means coupled to the data storage means, the control means configured to:
determine whether to operate in a dual access mode or a direct-access mode, wherein:
the dual access mode allows a data storage device to receive data access requests from a direct-access storage interface and a network-access storage interface simultaneously; and
the direct-access mode allows the data storage device to receive data access requests from the direct-access storage interface only;
receive a first data access request from the direct-access storage interface and a second data access request from the network-access storage interface while operating in the dual access mode, wherein the first data access request and the second data access request are received simultaneously; and
schedule the first data access request and the second data access request while operating in the dual access mode.

29. A data storage device, comprising:
data storage means; and
control means coupled to the data storage means, the control means configured to:
determine whether to operate in a dual access mode or a network-access mode, wherein:
the dual access mode allows a data storage device to receive data access requests from a direct-access storage interface and a network-access storage interface simultaneously; and
the network-access mode allows the data storage device to receive data access requests from the network-access storage interface only;
receive a first data access request from the direct-access storage interface and a second data access request from the network-access storage interface while operating in the dual access mode, wherein the first data access request and the second data access request are received simultaneously; and
schedule the first data access request and the second data access request while operating in the dual access mode.

* * * * *